US 9,235,595 B2

(12) United States Patent
Wang et al.

(10) Patent No.: US 9,235,595 B2
(45) Date of Patent: Jan. 12, 2016

(54) STORAGE REPLICATION SYSTEMS AND METHODS

(75) Inventors: Feng Wang, Sunnyvale, CA (US); Pu Paul Zhang, San Jose, CA (US); Mukund Agrawal, Pune (IN); Sumit Kumar, Pune (IN)

(73) Assignee: Symantec Corporation, Mountain View, CA (US)

( * ) Notice: Subject to any disclaimer, the term of this patent is extended or adjusted under 35 U.S.C. 154(b) by 607 days.

(21) Appl. No.: 12/638,912

(22) Filed: Dec. 15, 2009

(65) Prior Publication Data
US 2011/0082836 A1 Apr. 7, 2011

Related U.S. Application Data

(60) Provisional application No. 61/248,387, filed on Oct. 2, 2009.

(51) Int. Cl.
*G06F 17/30* (2006.01)

(52) U.S. Cl.
CPC .... *G06F 17/30176* (2013.01); *G06F 17/30123* (2013.01); *G06F 17/30144* (2013.01); *G06F 17/30212* (2013.01)

(58) Field of Classification Search
CPC .............. G06F 17/30144; G06F 17/30212; G06F 17/30123; G06F 17/30176
USPC ............. 707/649, 687, E17.005, E17.01; 711/E12.103
See application file for complete search history.

(56) References Cited

U.S. PATENT DOCUMENTS

| 5,572,709 A | * | 11/1996 | Fowler et al. ................... 703/27 |
| 5,689,706 A | | 11/1997 | Rao et al. |
| 6,230,212 B1 | * | 5/2001 | Morel et al. ................... 719/316 |
| 6,535,970 B1 | | 3/2003 | Bills et al. |
| 6,983,296 B1 | * | 1/2006 | Muhlestein et al. .......... 707/705 |
| 7,469,260 B2 | * | 12/2008 | Enko et al. ............................ 1/1 |
| 2004/0267830 A1 | * | 12/2004 | Wong et al. ................... 707/200 |

(Continued)

FOREIGN PATENT DOCUMENTS

| EP | 1349088 | 1/2003 |
| JP | 2003-263355 A | 9/2003 |
| JP | 2005-044370 A | 2/2005 |
| WO | 2005029333 | 3/2005 |
| WO | WO-2007139647 A1 | 12/2007 |

OTHER PUBLICATIONS

Saito, Y et al: "Taming aggressive replication in the Pangaea wide-area file system", Proceedings of the Fifth Symposium on Operating Systems Design and Implementation (OSDI'02) USENIX Assoc Berkeley, CA USA, , Dec. 9, 2002, pp. 15-30.

(Continued)

*Primary Examiner* — Shiow-Jy Fan
(74) *Attorney, Agent, or Firm* — Wilmer Cutler Pickering Hale and Dorr LLP

(57) ABSTRACT

Systems and methods for information storage replication are presented. In one embodiment, a namespace conversion process is performed. Node information regarding a file systems operation change is received. A changed node to pathname object conversion process is performed. An unchanged node to pathname object conversion process is performed. In one exemplary implementation, the changed node to pathname object conversion process and the unchanged node to pathname object conversion process utilize data structures that return the object indications and parent node indications. An object indication is inserted in a pathname.

18 Claims, 22 Drawing Sheets

(56) References Cited

U.S. PATENT DOCUMENTS

2005/0091286 A1* 4/2005 Fineberg et al. ............ 707/200
2005/0267982 A1* 12/2005 Nakatani et al. ............ 709/233
2007/0143371 A1 6/2007 Kottomtharayil
2007/0185852 A1 8/2007 Erofeev
2007/0186068 A1* 8/2007 Agrawal .................... 711/162

OTHER PUBLICATIONS

Symantec Corporation, "Veritas™ Volume Replicator Administrator's Guide", Solaris, 5.0 Maintenance Pack 3, 2008.

Symantec Corporation, "Veritas™ Volume Manager Administrators Guide", Solaris, 5.0 Maintenance Pack 3, 2008.

* cited by examiner

900

| 901 node₁ | 902 node₂ | 903 node₃ |
|---|---|---|
| 911 Pnode₁ | 912 Pnode₂ | 913 Pnode₃ |
| 921 Object₁ Name | 922 Object₂ Name | 923 Object₃ Name |

| 1001<br>1 | 1002<br>5 | 1003<br>8 | 1004<br>13 | 1002<br>21 |
|---|---|---|---|---|
| 1011<br>Null | 1012<br>21 | 1013<br>7 | 1014<br>21 | 1012<br>10 |
| 1021<br>a' | 1022<br>e | 1023<br>h' | 1024<br>l' | 1022<br>x |

1210
Freezing A Storage Image.

1220
Determining Node Indictors Associated With Name Space Changes

1230
Performing Namespace Conversion Process

1240
Filtering Unnecessary Information.

1250
Retrieving File Data

1260
Forwarding Operation Delta Information Including Pathname

| 1810
Image Freezing Module |
| --- |
| 1820
FCL Examination Module |
| 1830
Namespace Conversion Module |
| 1840
Filter Module |
| 1850
File Data Retrieval Module |
| 1860
Operation Delta Forwarding Module |

| 1910<br>Node Information Receiving Module |
| --- |
| 1920<br>Changed Node to Pathname Object Conversion Module |
| 1930<br>Unchanged Node to Pathname Object Conversion Module |
| 1940<br>Object Indicator Insertion Module |
| 1950<br>Null determination Module |
| 1960<br>Pathname Forwarding Module |

| 2010<br>Node Indicator Receiving Module |
| --- |
| 2020<br>Node Association Module |
| 2030<br>Object Indicator Retrieval Module |
| 2040<br>Parent Node Indicator Retrieval Module |
| 2050<br>Object Insertion Module |
| 2060<br>Node Indication Forwarding Module |

| 2110<br>Longest Chain Module |
| 2120<br>Parent Node Indicator Retrieval Module |
| 2130<br>Parent Node Indicator Forwarding Module |
| 2140<br>Unchanged Object Retrieval Module |
| 2150<br>Object Insertion Module |

FIG 21

STORAGE REPLICATION SYSTEMS AND METHODS

RELATED APPLICATIONS

This Application claims the benefit of and benefit of Provisional Application No. 61/248,387 entitled "STORAGE REPLICATION SYSTEMS AND METHODS" filed on Oct. 2, 2009, which is incorporated herein by this reference.

FIELD OF THE INVENTION

The present embodiments relate to the field of information storage replication.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities often involve the storage of large amounts of information.

Modern systems typically utilize vast amount of information on which significant resources are expended developing, storing and maintaining the information. Ever increasing complex applications typically involve larger amounts of storage and rapidly expanding file systems. With the ever increasing complexity there are usually greater opportunities for disastrous information corruption and loss. Maintaining accurate replicated images of the information is very important. However, maintaining duplicate storage images is usually very resource intensive. Approaches that completely copy an entire storage image at regular intervals can result in significant delays and impacts on system processing and communication networks. Some traditional replication approaches are at a block level only. Some other traditional replication approaches utilize a rsync operation (e.g., Unix platforms) but result in large data movements and post processing (e.g., requiring more memory and longer time).

Traditional file systems often utilize a pathname of object indicators (e.g., directories, files, etc.) to identify information in the file system namespace. In an effort to streamline file system management some systems utilize internal designations to manage the namespace objects. For example, a file system can utilize node indications that correspond to namespace objects. The node indications can be used for internal file system management operations. However, the internal designations are not typically transportable to a replication storage system. For example, internal node indications or designations for a source storage image are not typically internally applicable to a corresponding target storage image.

SUMMARY

Systems and methods for information storage replication are presented. In one embodiment, a namespace conversion or transformation process is performed in which a node indicator is transformed into an object indicator. Node information regarding a file system operation change is received. A changed node to pathname object conversion process is performed. An unchanged node to pathname object conversion process is performed. In one exemplary implementation, the changed node to pathname object conversion process and the unchanged node to pathname object conversion process utilize data structures that return the object indicators and parent node indicators. An object indicator is inserted in a pathname.

A changed node to pathname object conversion process can utilize a name space alteration tracking data structure (e.g., a hash table) that maps a node indicator associated with a namespace change to a parent node indicator and an object indicator or name. The unchanged node to pathname object conversion process utilizes a longest path tracking data structure (e.g., a prefix tree). A parent object node indicator can be returned as an input to the changed node pathname object conversion process.

In one embodiment, an article of manufacture includes a computer readable medium having instructions stored thereon that if executed by a computing device cause the computing device to perform a storage image replication in accordance with the replication methods. The instructions can be included in modules. An image freezing module manages frozen snapshots of a source file system at session checkpoints. A file change log examination module retrieves entries from a file change log (FCL) of changes between the sessions. A namespace conversion module converts node indications corresponding to the entries from a file change log to pathname indications. A filter module filters unnecessary operations. A delta file data retrieval module retrieves changes in file data between the sessions. A delta operation module forwards the pathname indications and the changes in the file data.

In one embodiment, a namespace conversion module includes a node indication receiving module that determines if a node indication is received; a changed node to pathname object conversion module that performs a changed node to pathname object conversion process; an unchanged node to pathname object conversion module performs an unchanged node to pathname object conversion process; and an object indication insertion module for inserting an object name in a pathname. The changed node to pathname object conversion module can obtain an object name associated with a node involved corresponding namespace change. The unchanged node to pathname object conversion module can obtain an object name associated with a node not involved in a corresponding namespace change. The node indication can include a unique inode number. The changed node to pathname object conversion module and the unchanged node to pathname object conversion module can utilize data structures that return the object indication. The changed node to pathname object conversion module can recursively process parent node indicators and the unchanged node to pathname object conversion module can recursively process parent node indicators.

In one embodiment, an information storage replication system includes a source storage component that stores information; a source storage manager that manages storage of information in the source storage component, including managing conversion of source internal node indicators to pathname indicators; and a target storage component for storing a replica of the information. The source storage manager can utilize data structures that return object indications and parent node indications. The data structures can include a hash table that maps a node associated with a namespace change to a parent node indication and an object name; and a prefix tree that maps a longest path of unchanged node from a previous session.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 9 is a block diagram representation of an exemplary hash table utilizing a node indicator as an index key and returning object names and parent node indicator in accordance with one embodiment.

FIG. 10 is a block diagram representation of an exemplary hash table utilizing an inode number as an index key and returning object names and parent inode number.

FIG. 12 is a flow chart of an exemplary replication method in accordance with one embodiment.

FIG. 18 is a block diagram of exemplary replication model in accordance with one embodiment.

FIG. 19 is a block diagram of exemplary namespace conversion module in accordance with one embodiment.

FIG. 20 is a block diagram of exemplary change node to pathname object conversion module in accordance with one embodiment.

FIG. 21 is a block diagram of exemplary unchanged node to pathname object conversion module in accordance with one embodiment.

DETAILED DESCRIPTION

Figure 1:
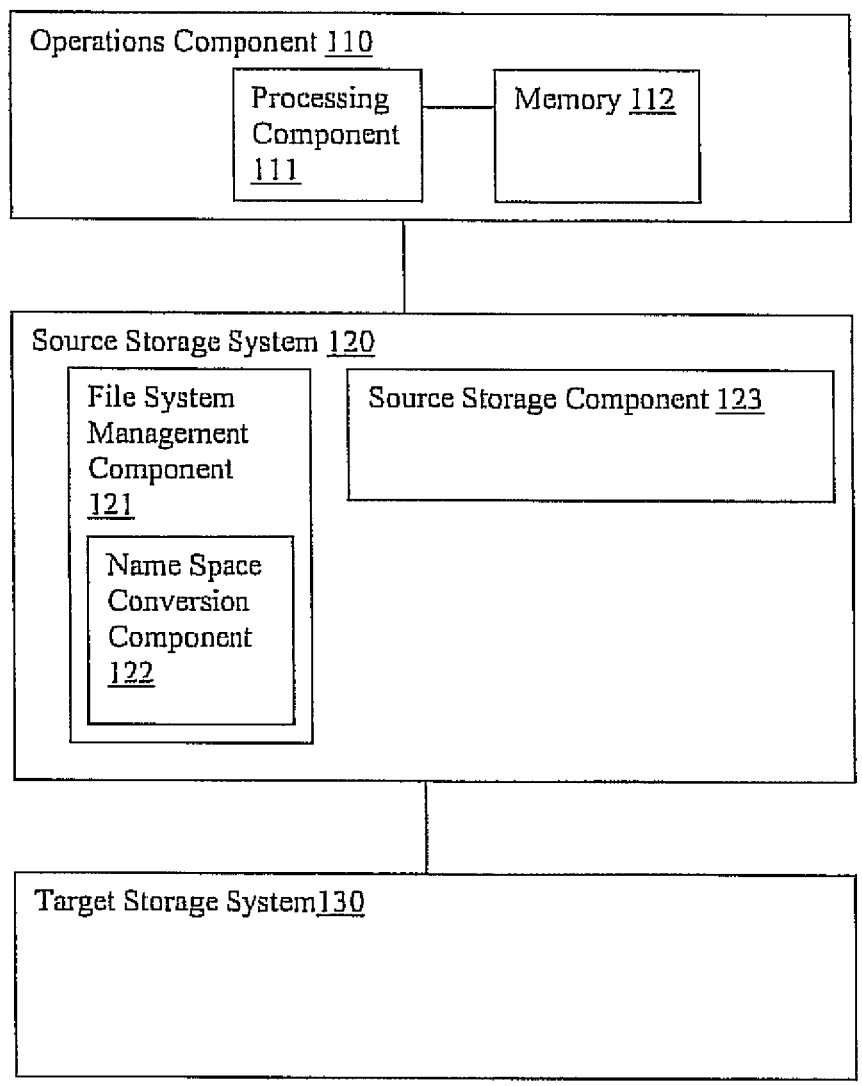
FIG. 1 is a block diagram of an exemplary system in accordance with one embodiment.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the description. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present replication systems and methods facilitate efficient and effective protection of information in a variety of system configurations. Replication systems and methods facilitate utilization of internal node indicators for internal name space management with efficient conversion of internal node indicators to object indicators in a pathname for replication operations directed to external storage resources. In one embodiment, a replication system manages storage of information in a source storage component image and replication of the information in a target storage component image. The management includes managing conversion of source internal node indicators to pathname indicators. In one embodiment, a source storage manager utilizes data structures that return object indications and parent node indications. The data structures can be utilized for node to object name conversion or "reverse" name lookup generation. In one exemplary implementation, the data structures include a hash table and a prefix tree. The hash table maps a node indication associated with a namespace change to a parent node indication and an object name. The prefix tree maps a longest path of unchanged node from a previous session. It is appreciated present systems and methods can be implemented in a variety of architectures and configurations. For example, present systems and methods can be implemented as part of a distributed computing environment, a cloud computing environment, a client server environment, etc.

It is appreciated that present replication system and methods facilitate incremental file-level replication. The replication systems and methods are compatible with partial file system replication of large file systems. The partial file system replication can be directed to updating a portion of a secondary or target storage resource during each replication operation. For example, a portion of a primary or source storage resource image that changes during a session is updated during a replication operation. The replications can be built on file change logging services provided by an underlying file system (e.g., FCL in VxFS). The logging service can track an internal file identifier or node indicator while the file system replication can use an absolute pathname to uniquely identify a file between a source and replication target. The ancestor directories of a given node can change during namespace operations (e.g., move, rename, newly created, etc.) resulting in the corresponding paths in the replication file systems differing until name space conversions are performed.

In one embodiment, a replication system includes storage resources. It is appreciated that the present systems and methods can be implemented in a variety of storage configurations. For example, the storage resources can be configured as source storage resources and target storage resources, primary storage resources and secondary storage resources, etc. FIG. 1 is a block diagram of exemplary system 100 in accordance with one embodiment. System 100 includes operations component 110 communicatively coupled to source storage system 120 which is communicatively coupled to target storage system 130. Operations component 110 includes processing component 111 and optional memory component 112. Source storage system 120 includes files system management component 121 and source storage component 123. Files system management component 121 includes name space conversion component 122.

It is appreciated that exemplary system 100 can have a variety of configurations. For example, operations component 110 and source storage system 120 can be part of a local system or facility and target storage system 130 can be part of a remote system or facility. It is appreciated that the processing component 111 can receive information (e.g., instructions, data, etc.) from source storage component 123. In one exemplary implementation, operations component 110 is part of a local system or facility while source storage system 120 and target storage system 130 are part of a remote system or facility.

It is appreciated there can be a variety of operation component and source storage component configurations. Information can be communicated between multiple operation components (not shown) and source storage system 120. Information can also be communicated between multiple storage systems and an operation component. It is also appreciated there can be a variety of source storage system and target storage system configurations. A source storage system can communicate with multiple target storage systems and multiple target storage systems can communicate with a source storage system.

The components of system 100 cooperatively operate to facilitate a variety of operations (e.g., application operations, etc.) with source storage and efficient and effective replicated target storage. Operations component 110 can perform a variety of operations. For example, memory 112 stores a variety of application operation instructions which are performed by processor 111. Source Storage System 120 stores information (e.g., in source stage component 123) associated with the operations performed by operations component 110. File system management component 121 manages storage of information received from operations components 110 and forwarding of information to target storage system 130. File system management component 121 includes name space conversion component 122 which performs name space conversions associated with forwarding information to target storage system 130. Target storage system 130 stores replications of information images stored on source storage component 123.

The information in the storage resources can be organized in storage hierarchies that utilize a variety of designations for tracking the arrangement of information storage. For example, a pathname designation namespace, a node designation namespace, a combination, etc. It is appreciated that a pathname designation namespace indicator can include pathname elements concatenated together with slashes. The pathname elements can correspond to objects and can include directory designations, file name designations, etc. For example, a pathname designation or indicator can identify a pathname by the expression directoryA/directoryB/directoryC/filename1, dA/dB/dC/f1, etc. Each preceding pathname element indicates the object that includes the following object.

Figure 2:
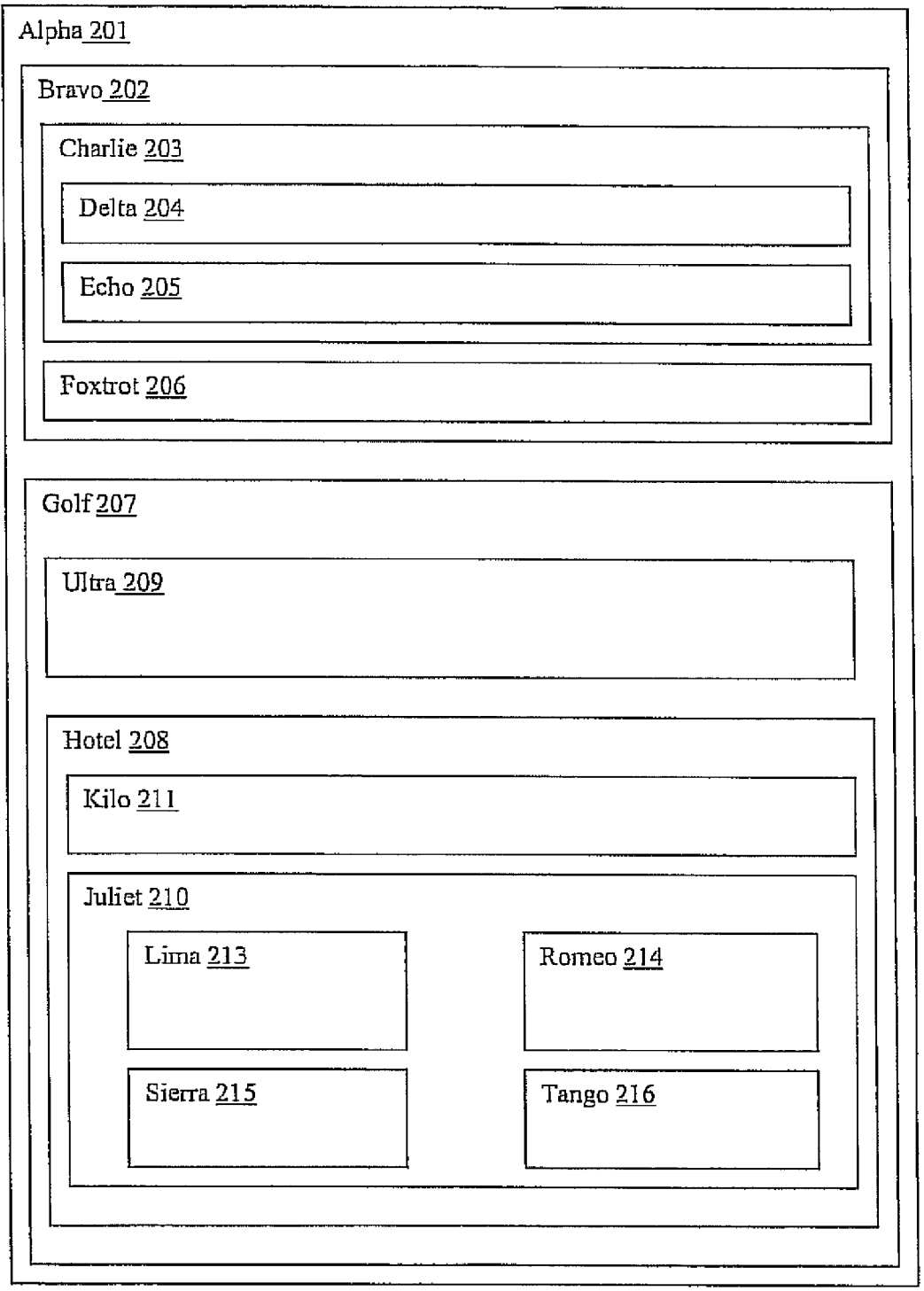
FIG. 2 is an exemplary block diagram of a pathname element relationship in accordance with one embodiment.

FIG. 2 is an exemplary block diagram of a pathname element relationship 200 in accordance with one embodiment. Directory alpha 201 includes directory bravo 202 and directory golf 207. Directory bravo 202 includes directory charlie 203 and directory foxtrot 206. Directory charlie includes directory delta 204 and file echo 205. Directory golf 207 includes directory hotel 208 and directory ultra 209. Directory hotel includes directory juliet 210 and file kilo 211. Directory juliet includes files lima 213, romeo 214, sierra 215 and tango 216. It is appreciated that the files can include information. For example, the files can include various types of information (e.g., data, instructions, etc.). In one exemplary implementation, a file can include data (e.g., word programming files, video information, etc.) and/or programming instructions (e.g., software program instructions, executables, binaries, etc.) associated with a variety applications (e.g., word programming applications, accounting applications, internet applications, video applications, etc.).

Figure 3:
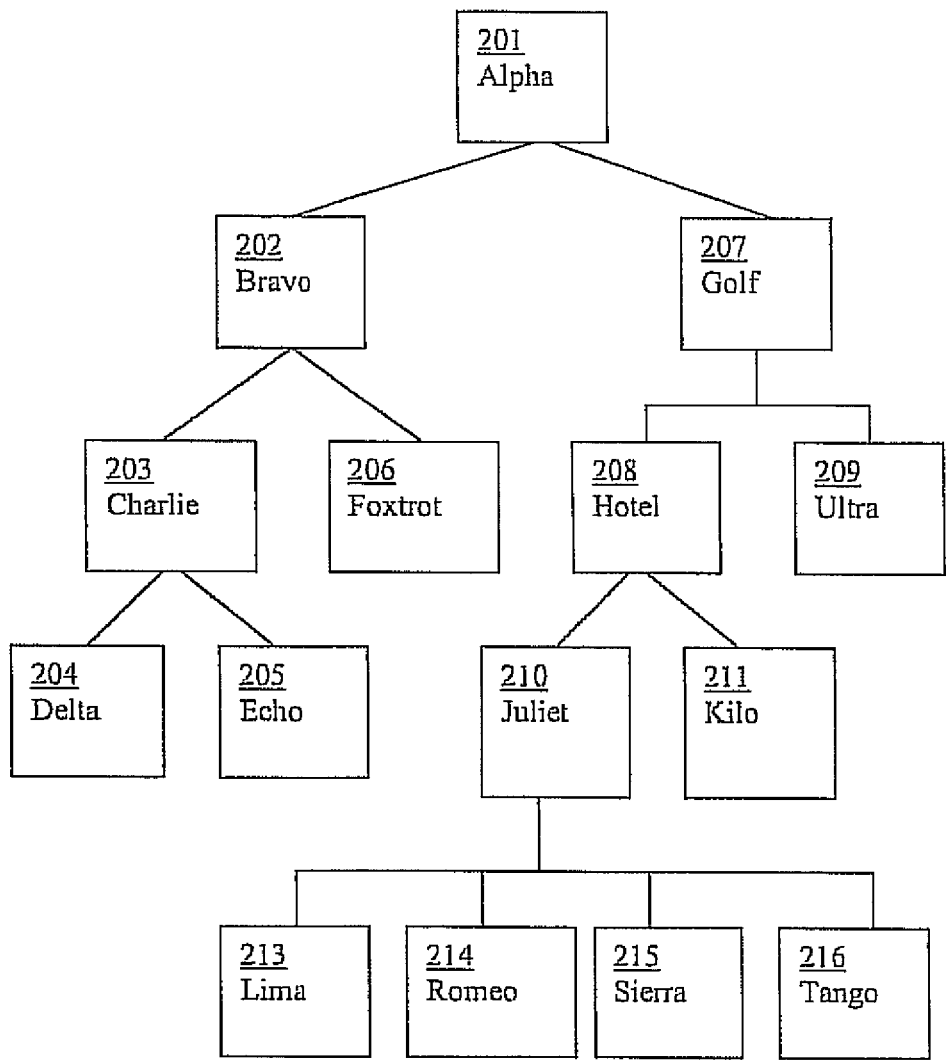
FIG. 3 is another exemplary block diagram representation of a pathname element hierarchical relationship in accordance with one embodiment.

FIG. 3 is another exemplary block diagram representation of a pathname element hierarchical relationship 300 in accordance with one embodiment. In one embodiment, pathname element hierarchical relationship 300 corresponds to pathname element relationship 200. Pathname element hierarchical relationship 300 includes directory alpha 201 directory bravo 202, directory charlie 203, directory foxtrot 206, directory delta 204, file echo 205, directory golf 207, directory hotel 208, directory ultra 209, directory juliet 210, and files kilo 211, lima 213, romeo 214, sierra 215 and tango 216. The objects that are shown at a lower level and coupled to an object at a higher level are included in the higher level object. For example, files delta 204 and echo 205 are included in directory charlie 203 which is included in directory bravo 202. Lower level file lime 213 is not included in higher directory charlie 203 because file lima 213 is not coupled to charlie 203.

Figure 4:
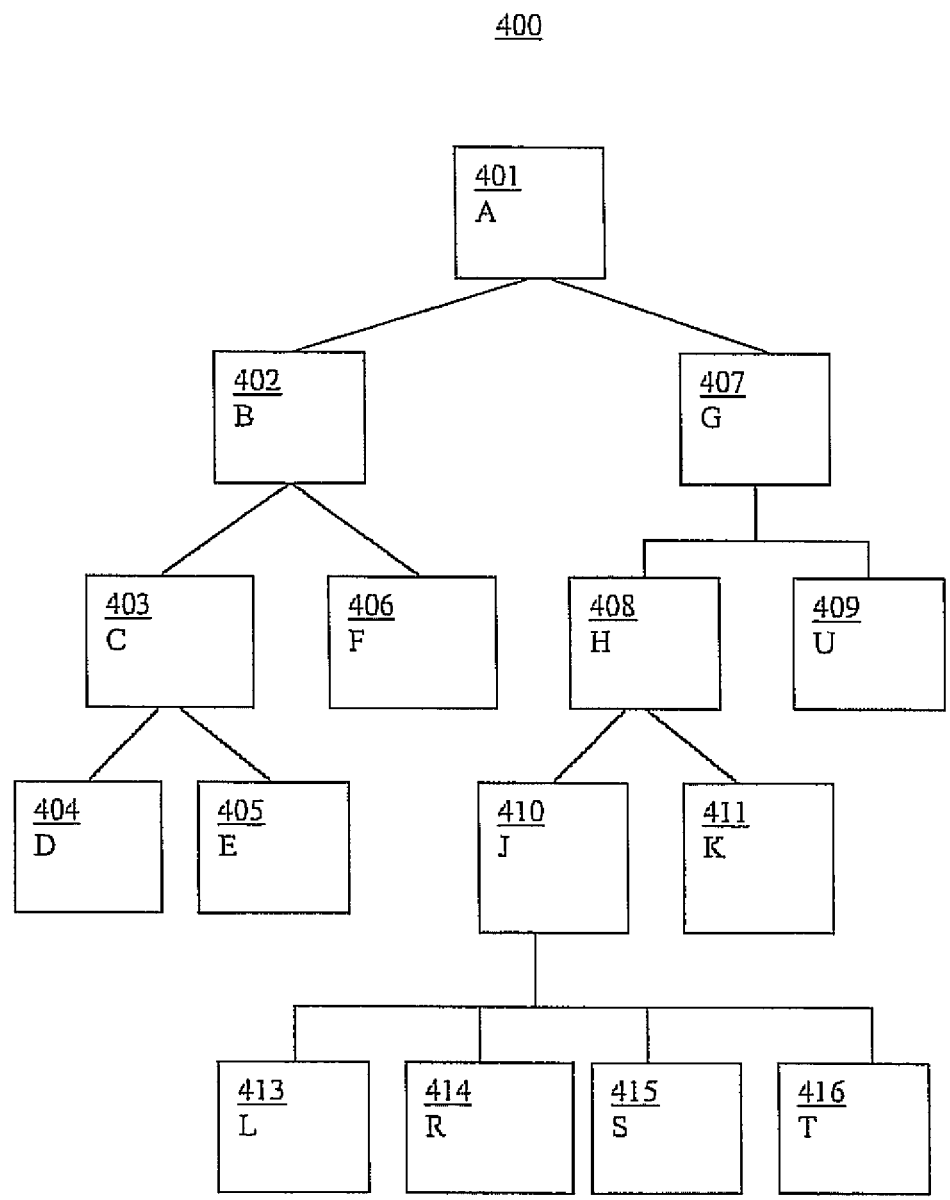
FIG. 4 is a block diagram representation of an exemplary pathname element hierarchical relationship with different object indicators in accordance with one embodiment.

It is appreciated that a variety of object indicators can be utilized to designate a pathname element. FIG. 4 is an exemplary block diagram representation of a pathname element hierarchical relationship 400 with different object indicators in accordance with one embodiment. Pathname element hierarchical relationship 400 includes directory a 401, directory b 402, directory c 403, directory f 406, directory d 404, file e 405, directory g 407, directory h 408, directory u 409, directory j 410, file k 411, file l 413, file r 414, file s 415 and file t 416. The objects that are shown at a lower level and coupled to an object at a higher level are included in the higher level object.

With reference again to FIG. 1, it is appreciated that as operation component 110 performs operations, changes can occur to both file data and namespace information in source storage systems 120. The changes to the source storage system image occur over time as the operations proceed. However, the replication update of the source storage system image to an associated target storage system image occurs at designated session time durations. In one embodiment, the source storage system image and associated target storage system image match at the beginning of a session and the target storage system image remains the same while the source storage system image changes during the session. At the end of a session or a "checkpoint" (e.g., predetermined time duration, occurrence of an event, after the occurrence of a particular number of changes, etc.) the source storage system image is frozen or locked and the image changes are replicated on an associated target storage system image and the associated target storage system image is updated.

Figure 5:
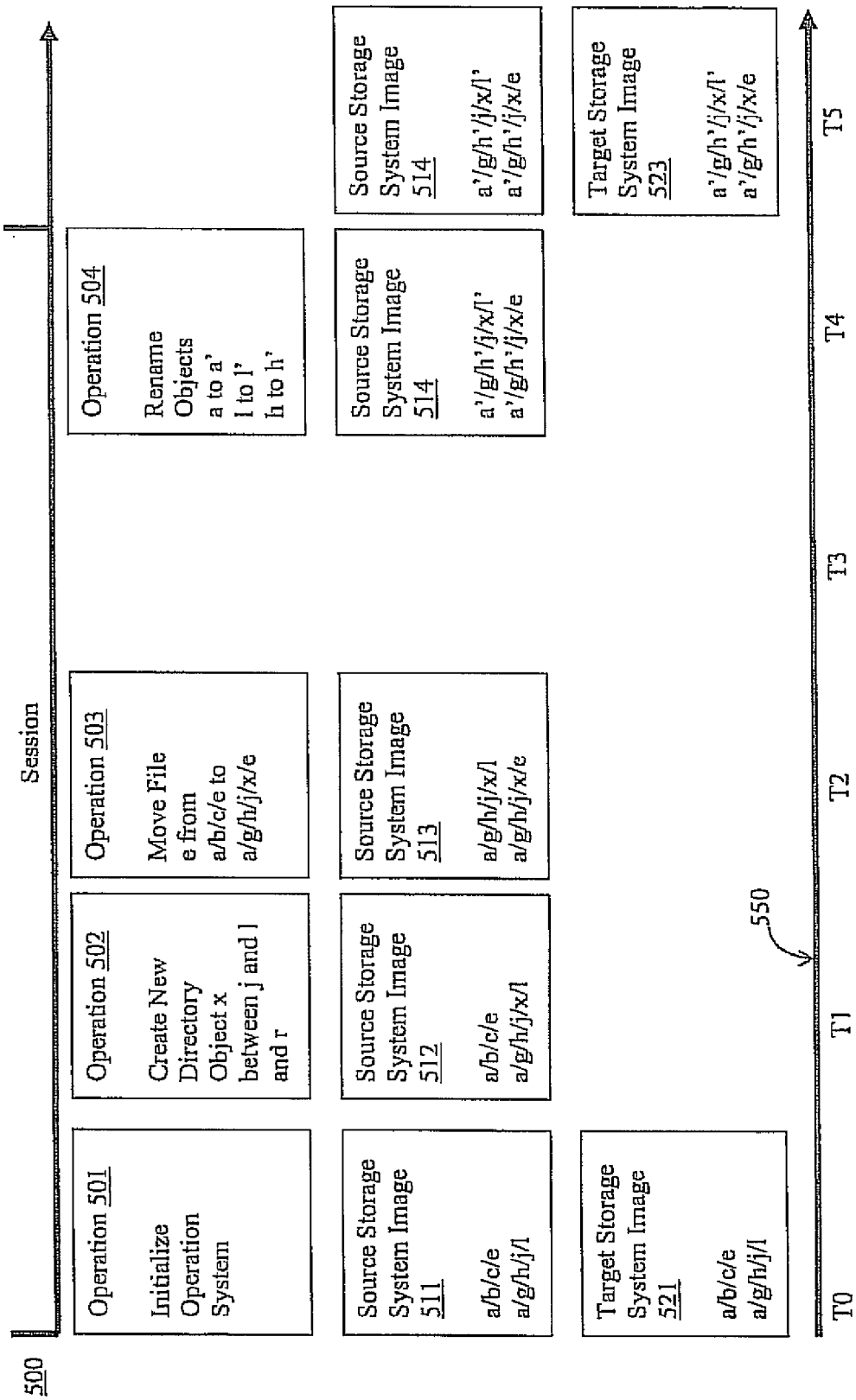
FIG. 5 is a block diagram representation of exemplary changes in a source storage system as operations occur between times in accordance with one embodiment.

FIG. 5 is a block diagram representation of exemplary changes in a source storage system as operations occur between time t0 and time t1 in accordance with one embodiment. At time t0 there is a frozen image 511. The first operation session begins and operation 501 initializes the operation system. Source system image 511 includes a session beginning file hierarchy. Target system image 521 matches the session beginning file hierarchy of source system image 511 at time t0. In one embodiment, the source system image 511 and target system image 521 correspond to pathname element hierarchical relationship 400 (e.g., source storage system image 511 and target storage system image 521 include pathnames a/b/c/e, a/g/h/j/l, etc.). Operation 502 creates a new directory object x between directory object j and files l and r at time t1 and source storage system image 512 includes pathname a/b/c/e and a/g/h/j/x/l and logs the change. At time t2, operation 503 moves file e from a/b/c/e to a/g/h/j/x/e and storage system image 513 removes pathname a/b/c/e and includes pathname a/g/h/j/x/e while logging the change. At time t4 operation 504 renames objects a to a'; l to l' and h to h' and source storage system image 514 includes pathname a'/g/h'/j/x/e and a'/g/h'/j/x/l'. At time t5 the session ends and source storage system image 514 is frozen or locked while the image changes are replicated on an associated target storage system image 523. For example, target storage system image 522 is updated to replicate a'/g/h'/j/x/l' and a'/g/h'/j/x/e.

It is appreciated that there can be numerous operations in a session and session lengths can vary. It is also appreciated session lengths can be lengthened or shortened. In one embodiment, the session length in FIG. 5 is split into multiple sessions. For example, at time t3 the first session can end and source storage system image 513 is frozen or locked while the image changes are replicated on an associated target storage system image. For example, the associate target storage system image can be updated to replicate a/g/h/j/x/l and a/g/h/j/x/e at time t3.

In one embodiment, operations continue to proceed and intervening information is tracked while a source storage system image is frozen. When the source storage system image is unlocked, the source storage system image is updated to correspond with the tracked intervening information.

Figure 6:
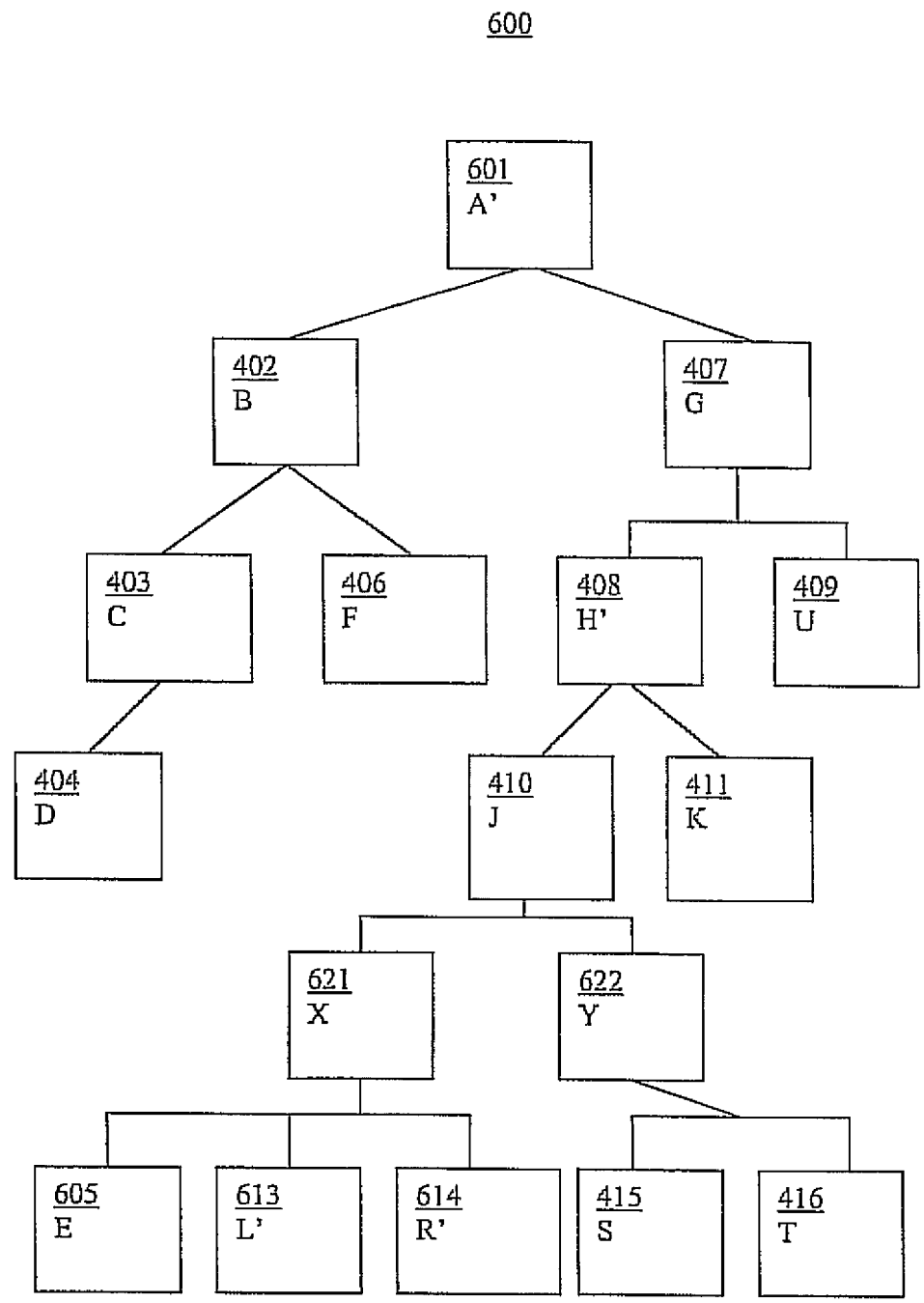
FIG. 6 is a block diagram representation of an exemplary pathname element hierarchical relationship after changes in accordance with one embodiment.

In an effort not to obfuscate the description with excessive details, a portion of the session file hierarchy pathnames are illustrated in FIG. 5 including path names a/b/c/e and a/g/h/j/l. It is appreciated that other path names (e.g., a/b/c/d, a/g/h/j/r, a/g/h/j/t, a/g/u, etc.) can be included in the source system images and target system images. It is also appreciated that additional operations (not shown) can be included (e.g., create new directory object y under j and above s and l; rename object r to r', etc.) and corresponding pathname changes can be included in the source system images (e.g., a/g/h/j/y/t, a/g/h/j/x/r', etc.) and target system images. FIG. 6 is an exemplary block diagram representation of a pathname element hierarchical relationship 600 after changes in accordance with one embodiment. Pathname element hierarchical relationship 600 includes directory a' 601, directory b 402, directory c 403, directory f 406, directory d 404, directory g 407, directory h' 608, directory u 409, file k 411, directory j 410, directory x 621, file e 605, file l' 613, file r' 614, directory y 422 file s 415 and file t 416. The objects that are shown at a lower level and coupled to an object at a higher level are included in the higher level object.

Figure 7:
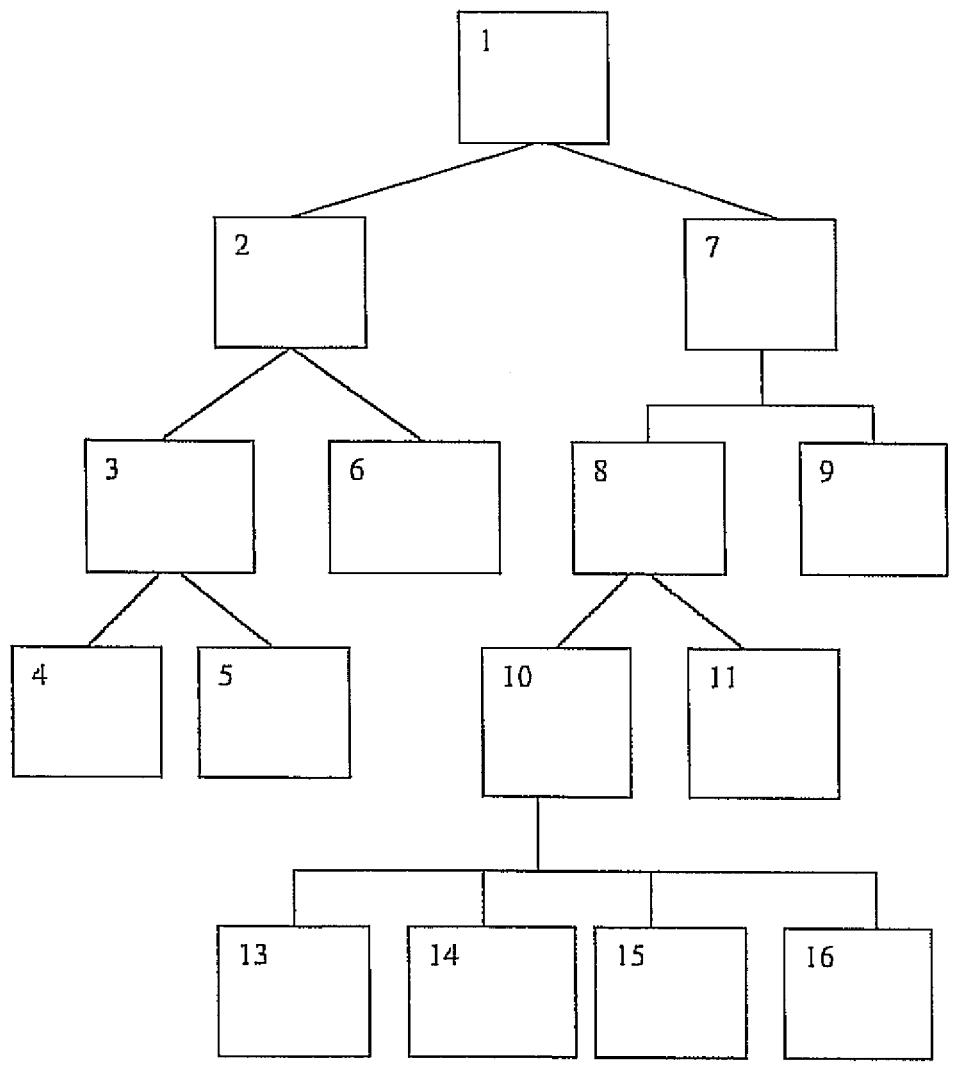
FIG. 7 is a block diagram representation of an exemplary file namespace object inode hierarchy in accordance with one embodiment.

A file system architecture can utilize node indications to track information associated with the file system name namespace. For example, a file system architecture can utilize unique node indicator corresponding to each object (e.g., directory, file, etc.) in a file system name. In one embodiment, an internal node indicator (inode) is associated with each object. In one exemplary implementation, a node indicator is an inode number and as each object is created a unique sequential inode number is associated with or assigned to the node. FIG. 7 is an exemplary block diagram representation of a file namespace object node hierarchy 700 in accordance with one embodiment. File namespace object node hierarchy 700 includes inode 1, inode 2, inode 3, inode 4, inode 5, inode 6, inode 7, inode 8, inode 9, inode 10, inode 11, inode 12, inode 13, inode 14, inode 15 and inode 16. In one embodiment, file namespace object inode hierarchy 700 corresponds to exemplary block diagram representation of a pathname element hierarchical relationship 400.

Figure 8:
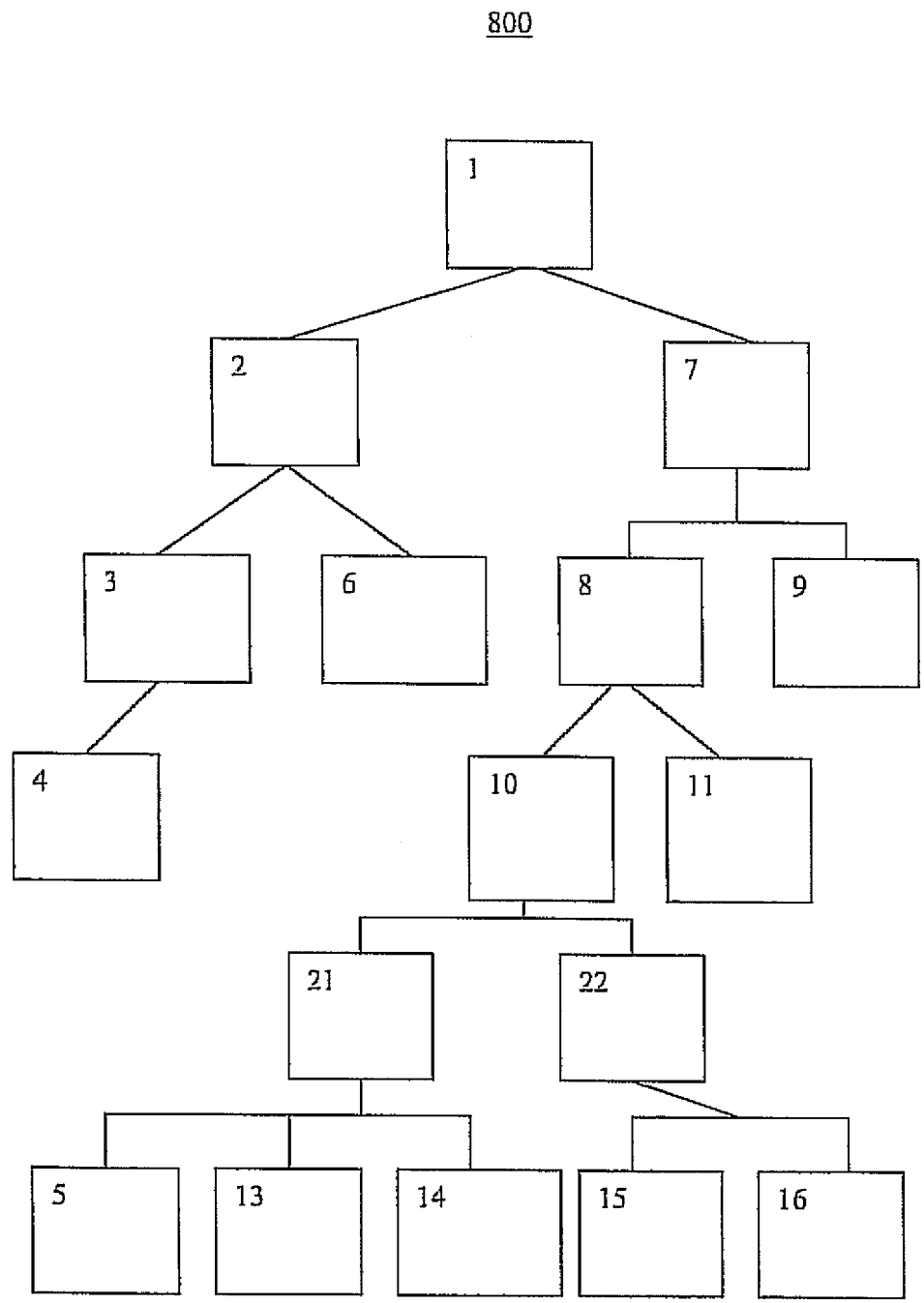
FIG. 8 is a block diagram representation of an exemplary file namespace object node hierarchy after operation changes in accordance with one embodiment.

As operations proceed during sessions changes associated with a node can occur. For example, relationships between nodes can change (e.g., anode can be moved, a nodes corresponding object name can change, nodes can be created, nodes can be removed, etc.). FIG. 8 is an exemplary block diagram representation of a file namespace object inode hierarchy 800 after operation changes in accordance with one embodiment. File namespace object inode hierarchy 800 includes inode 1, inode 2, inode 3, inode 4, inode 5, inode 6, inode 7, inode 8, inode 9, inode 10, inode 11, inode 12, inode 13, inode 14, inode 15, inode 16, inode 21 and inode 22. In one embodiment, file namespace object inode hierarchy 800 corresponds to exemplary block diagram representation of a pathname element hierarchical relationship 600.

In one embodiment, nodes that are associated with changes in a source storage system image are tracked including nodes associated with namespace changes. In one exemplary implementation, a file change log (FCL) for each session is maintained and the FCL includes nodes indicators associated with namespace changes. The FCL can be included in a data structure. For example, the data structure can be a table that corresponds to the following representation:

| Session Break | |
| --- | --- |
| Operation 502 | inode 21 |
| Operation 503 | inode 5 |
| Operation 504 | inode 1 |
| Operation 504 | inode 8 |
| Operation 504 | inode 13 |

At each session break the changes that occurred in the source storage system image, including namespace changes, are replicated in the target storage system image. However, node indications utilized internally to track namespace changes within the source storage system image are not utilized to indicate namespace changes to the target storage system image. In one embodiment, the internal node indications in the source storage system image are not compatible with internal node indications in the target storage system image. A namespace conversion is utilized to reformulate a pathname indication.

In one embodiment, a name space alteration tracking data structure is utilized to track name space alterations (e.g., object moves, object rename, object creation, etc.). In one exemplary implementation, the name space alteration tracking data structure utilizes a node indicator as an index key that is mapped to an object indicator and a parent node indicator. It is appreciated the name space alteration tracking data structure can utilize a node indicator and a generation count as an index key. It is also appreciated a variety of name space alteration tracking data structures can be utilized. For example, data corresponding to a hash table can be utilized. FIG. 9 is an exemplary block diagram representation of hash table 900 utilizing a node indicator as an index key and returning object names and parent node indicator in accordance with one embodiment. Hash table 900 includes cell 901 for node$_1$, cell 911 for parent node$_1$ (pnode$_1$), cell 921 for object$_1$ name, cell 902 for node$_2$, cell 912 for pnode$_2$, cell 922 for object$_2$ name, cell 903 for node$_3$, cell 913 for pnode$_3$, and cell 923 for object₃ name. In one exemplary implementation, node₂ is utilized as a key index for a lookup operation into hash table 900 which returns pnode₂ and object₂ name.

FIG. 10 is an exemplary block diagram representation of hash table 1000 utilizing an inode number as an index key and returning object names and parent node number. Hash table 1000 includes changes that occurred in the operation session illustrated in FIGS. 5 and 6. Hash table 1000 includes: cell 1001 populated with inode number 1, cell 1011 populated with inode number null, cell 1021 populated with object name a'; cell 1002 populated with inode number 5, cell 1012 populated with inode number 21, and cell 1022 populated with object name e; cell 1003 populated with inode number 8, cell 1013 populated with inode number 7, cell 1023 populated with object name h'; cell 1004 populated with inode number 13, cell 1014 populated with inode number 21, cell 1024 populated with object name l'; and cell 1005 populated with inode number 21, cell 1015 populated with inode number 10, cell 1025 populated with object name x. The inode numbers are utilized as a key index for a lookup operation into hash table 1000 which returns an inode number of a parent and object name. In one exemplary implementation, inode number 5 is utilized as a key index for a lookup operation into hash table 1000 which returns inode number 21 and object name e.

Figure 11:
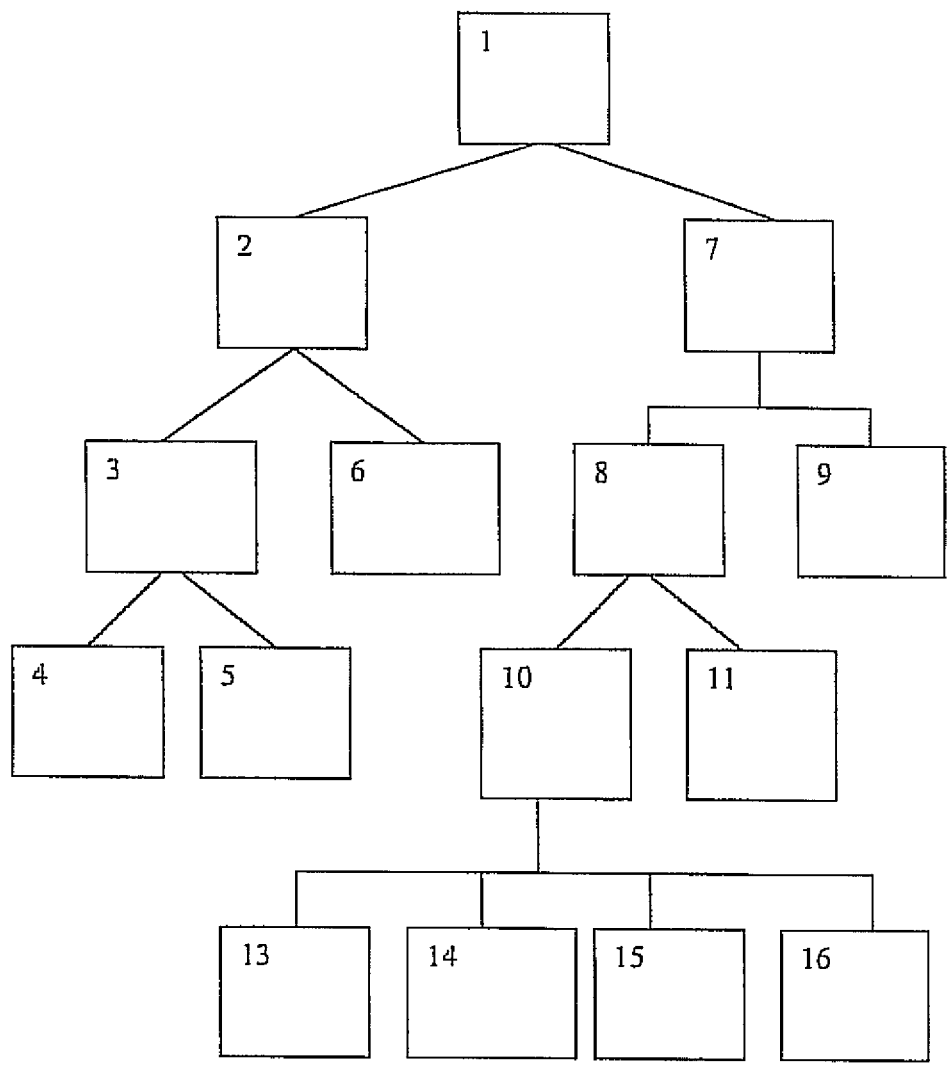
FIG. 11 is a block diagram representation of an exemplary prefix tree for tracking longest paths at the end of a previous session in accordance with one embodiment.

In one embodiment, a longest path tracking data structure is utilized to track longest paths at the end of a previous session. In one exemplary implementation, original pathnames (e.g., pathname in previous checkpoint) of moved or renamed objects are tracked. It is appreciate a variety of name space alteration tracking data structures can be utilized. For example, a linear search table, a prefix tree, etc. FIG. 11 is an exemplary block diagram representation of prefix tree 1100 for tracking longest paths at the end of a previous session in accordance with one embodiment. In one embodiment, prefix tree 1100 includes inode 1, inode 2, inode 3, inode 4, inode 5, inode 6, inode 7, inode 8, inode 9, inode 10, inode 11, inode 12, inode 13, inode 14, inode 15 and inode 16. In one exemplary implementation, prefix tree 1100 corresponds to file namespace object inode hierarchy 700.

It is appreciated that prefix tree 1100 can be represented by text strings. For example, the following table includes text strings that can be utilized to represent some of the path chains in a prefix tree.

| 1/7/8/10/13 |
|---|
| 1/2/3/5 |
| 1/7/8/10/13 |
| 1/7/8/11 |
| 1/7/9 |

FIG. 12 is a flow chart of exemplary replication method 1200 in accordance with one embodiment. Replication method 1200 facilitates utilization of node indicators for name space management with efficient conversion of node indicators to object indicators in a pathname for replication operations directed to external storage resources.

At block 1210, a storage image is frozen. In one embodiment, the frozen image is a snapshot of a source storage file system. In one exemplary implementation, the snapshot is taken at a session checkpoint.

Node indicators associated with name space changes in a file system are determined in block 1220. In one embodiment, a file change log is examined and nodes associated with object changes are retrieved. In one exemplary implementation, a file change log (FCL) for each session is maintained and the FCL includes indications of nodes associated with namespace changes.

At block 1230, a namespace conversion process is performed. In one embodiment, a node indicator is converted to a pathname object indicator. In one exemplary implementation, data structures are utilized to retrieve an object indictor and a parent node indicator. For example, a name space alteration tracking data structure is utilized to track name space alterations (e.g., object moves, object rename, object creation, etc.) and determine a changed object indicator. A longest path tracking data structure is utilized to track longest paths at the end of a previous session and determine an unchanged object indicator. In one embodiment, an internal node indictor is transformed into a pathname object.

Unnecessary information is filtered in block 1240.

In block 1250, file data is retrieved. In one exemplary implementation, file data can include various types of data (e.g., text, video information, etc.) and/or programming instructions (e.g., software program instructions, executables, binaries, etc.) associated with a variety applications (e.g., word programming applications, accounting applications, internet applications, video applications, etc.).

Changes in information or storage images resulting from operations between session checkpoints are forwarded in block 1260. The changes can include object indicators associated with changes in the namespace as well as file data. In one embodiment, the delta in the information is forwarded to a replication storage system (e.g., a target storage system, secondary storage system, etc.). In one embodiment, pathnames with object indicators converted from node indicators associated with namespace changes are forwarded to a replication storage system.

Figure 13:
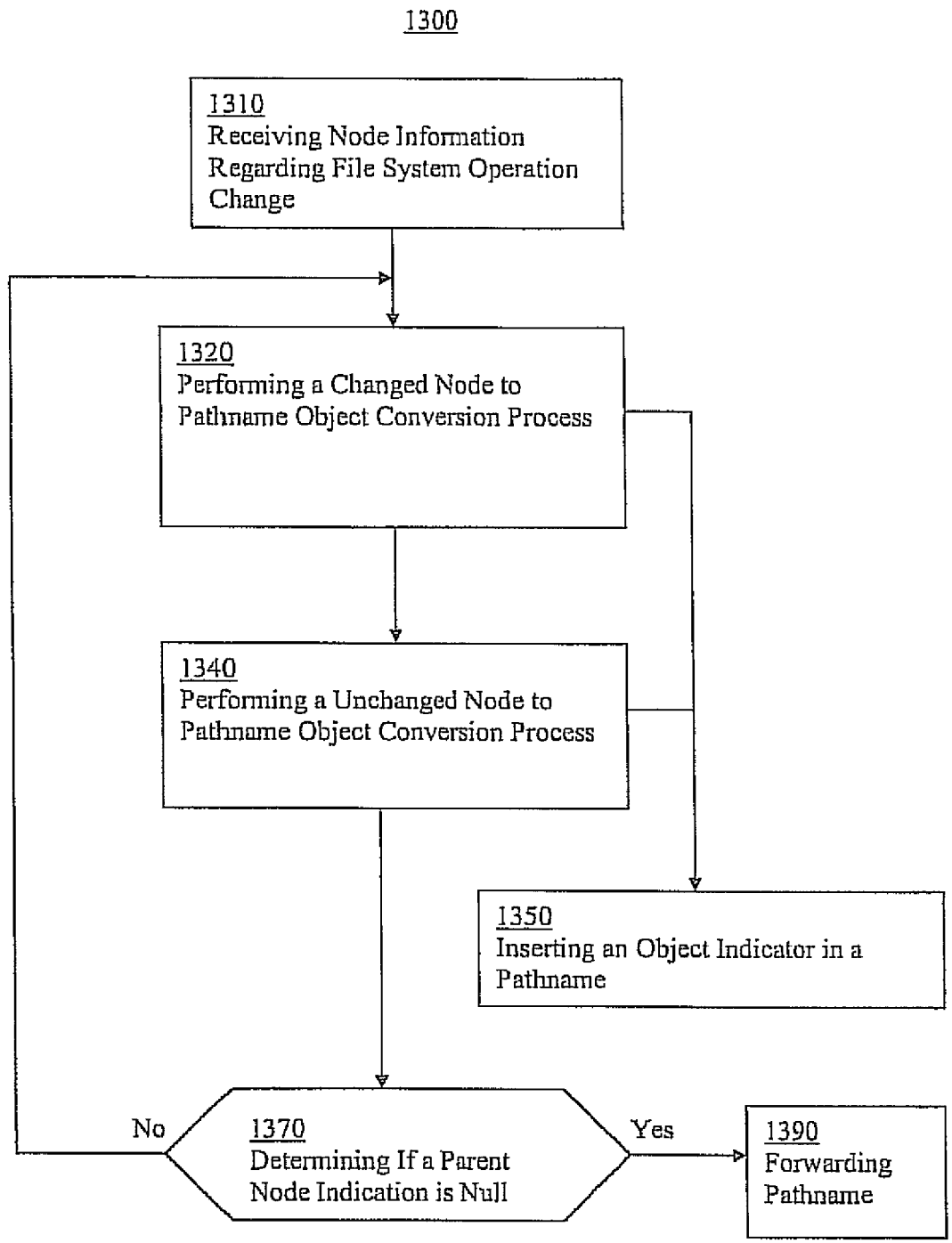
FIG. 13 is a flow chart of an exemplary namespace conversion process in accordance with one embodiment.

FIG. 13 is a flow chart of exemplary namespace conversion process or method 1300 in accordance with one embodiment. In one embodiment, namespace conversion process 1300 is similar to the namespace conversion process utilized in block 1230 of replication method 1200.

In block 1310, node information regarding file systems operation changes is received. In one embodiment, the node indicators determined in block 1220 of replication method 1200 are received. For example, nodes identified in a file change log (FCL) as being associated with namespace changes.

At block 1320, a changed node to pathname object conversion process is performed. In one embodiment, a changed node to pathname object conversion process utilizes a data structure that returns an object indicator and a parent node number. In one exemplary implementation, the data structure is a name space alteration tracking data structure that maps a node indicator associated with a namespace change to a parent node indicator and an object name. The name space alteration tracking data structure can include a hash table.

Unchanged node to pathname object conversion process is performed at block 1340. In one embodiment, an unchanged node to pathname object conversion process utilizes a data structure that returns an object indicator and a parent node number. In one exemplary implementation, unchanged node to pathname object conversion process utilizes a longest path tracking data structure. The longest path tracking data structure can be a prefix tree.

A parent object node indicator can be returned as an input to the changed node pathname object conversion process (e.g. 1320). A parent object node indicator can also be returned via the changed node pathname object conversion process as an input to the unchanged node to pathname object conversion process. For example, a parent object node indicator can be returned in a recursive loop through the changed node pathname object conversion process and the unchanged node to pathname object conversion process.

In block 1350, an object indicator is inserted in the pathname. In one embodiment, an object indicator is inserted in the pathname based upon the results of the changed node to pathname object conversion process and the unchanged node to pathname object conversion process. In one embodiment, the object indicator is concatenated to a pathname. For example, the object indicator is inserted between slashes of a pathname.

A determination is made if a parent node indicator is null at block 1370. If not null then proceed back to block 1330. If null proceed to block 1390.

In block 1390, the pathname is forwarded. In one embodiment, a converted pathname is forwarded to a target storage resource.

Figure 14:
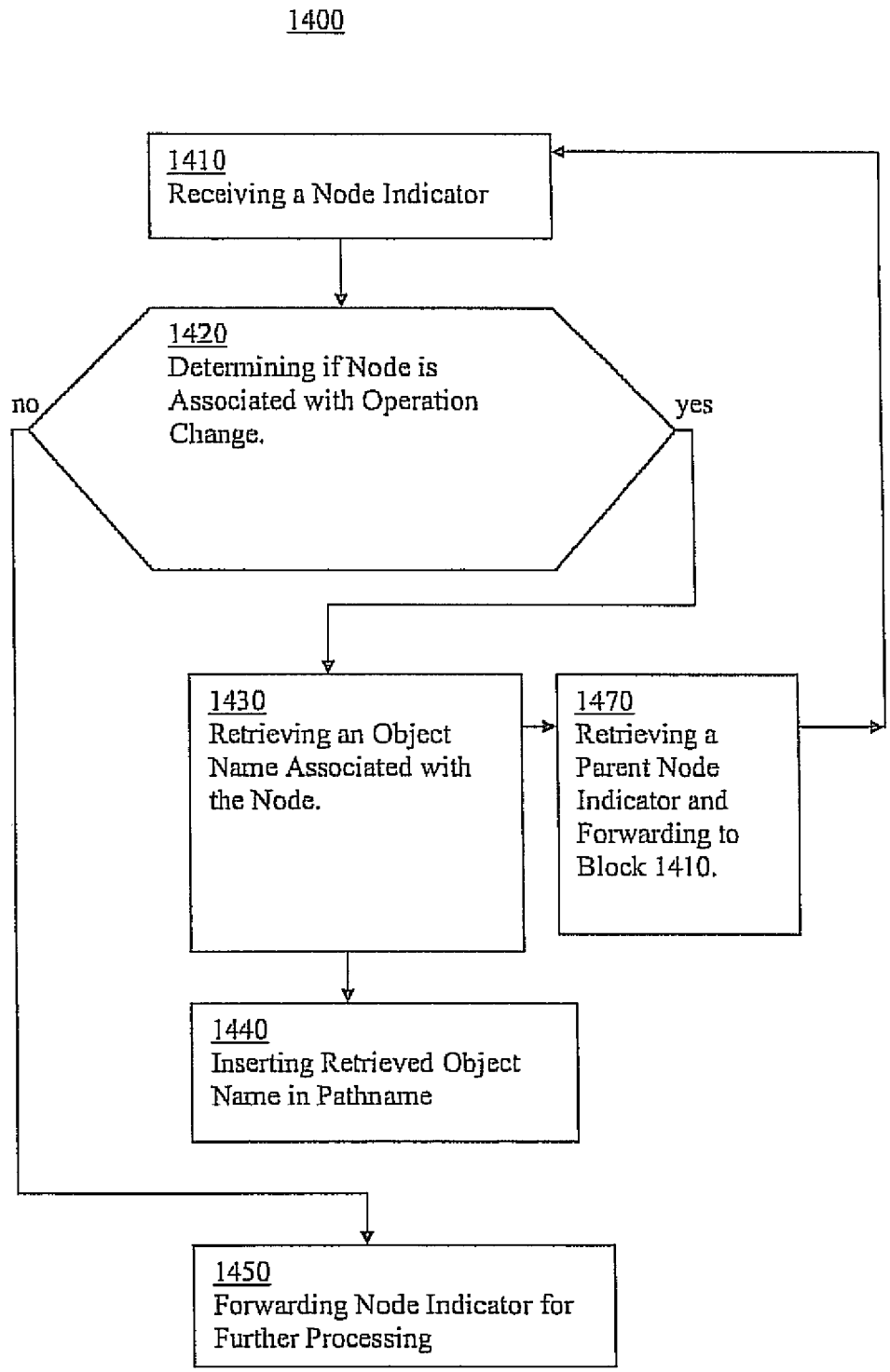
FIG. 14 is a flow chart of exemplary changed node to pathname object conversion process in accordance with one embodiment.

FIG. 14 is a flow chart of exemplary changed node to pathname object conversion process or method 1400 in accordance with one embodiment. Changed node to pathname object conversion process 1400 is similar to a changed node to a pathname object conversion process utilized in block 1330.

In block 1410, a node indicator is received. In one embodiment, the node indicator is received from block 1220. In one exemplary implementation, the node indicator is received from a file change log. The node indicator can be a parent node indicator received from block 1470 below. The node indicator can also be a parent node indicator received from an unchanged node to pathname object element conversion process. For example, the unnamed node to pathname to object element conversion process can be similar to the process utilized in block 1340.

At block 1420, a determination is made if a node is associated with a namespace change. In one embodiment, an inode number is utilized as a key into a hash table of inode numbers associated with namespace changes. If a search of the table indicates the inode number is not present in the table the process proceeds to block 1450. If a search of the table indicates the inode number is present the process proceeds to block 1430.

At block 1430, an object name associated with the node is retrieved. In one embodiment, the object name is retrieved from a hash table that maps node indicators associated with namespace changes to object names. In one exemplary implementation, the hash table similar to hash table number 900 shown in FIG. 9 is utilized to retrieve the object name.

At block 1440, the retrieved object name is inserted in a pathname. In one embodiment, a "/" is added to the beginning of the pathname and the object name is concatenated at the beginning of a pathname.

A node indicator associated with a parent node is retrieved at block 1470 and forwarded to block 1410.

At block 1450, the node indicator is forwarded for further processing. In one embodiment, the node indicator is forwarded to an unchanged node to pathname object element conversion process similar to the process utilized in block 1340.

Figure 15:
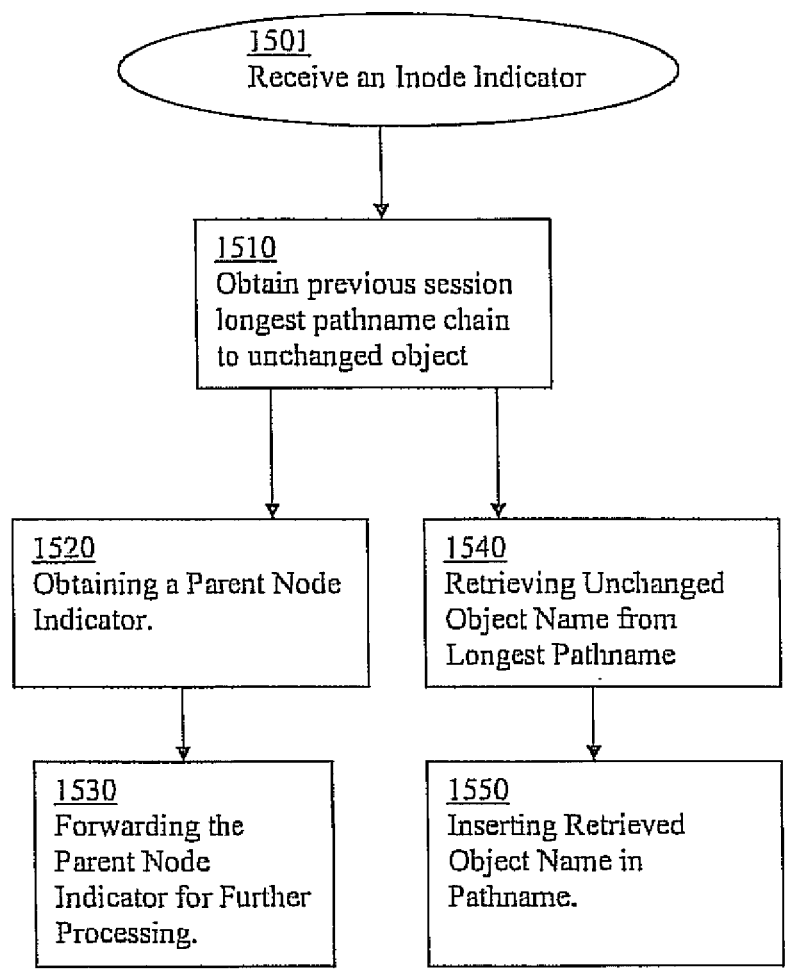
FIG. 15 is an exemplary flow chart of an exemplary unchanged node to pathname object conversion process in accordance with one embodiment.

FIG. 15 is a flow chart of an exemplary unchanged node to pathname object conversion process or method 1500 in accordance with one embodiment. In one embodiment, pathname object conversion process 1500 is similar to the unchanged node to pathname object conversion process utilized in block 1340.

At block 1501, a node indicator is received. In one embodiment, the node indicator is received from block 1220. In one exemplary implementation, the node indicator is received from a file change log. The node indicator can be a parent node indicator received from block 1470 of FIG. 4. The node indicator can also be a parent node indicator received from an unchanged node to pathname object element conversion process. For example, the unnamed node to pathname to object element conversion process can be similar to the process utilized in block 1530 below.

At block 1510, a previous session longest pathname chain to an unchanged object is obtained. In one embodiment, the previous session longest pathname chain is a prefix tree. For example the prefix tree can be similar to the prefix tree shown in FIG. 11.

In block 1520, a parent node indicator is obtained. In one embodiment, the parent node indicator is the second to last node indicator in the longest chain in a prefix tree.

In block 1530, the node indicator associated with the parent is forwarded for further processing. In one embodiment, the parent node indicator is forwarded to a changed node to pathname object conversion process.

At block 1540, an unchanged object name is retrieved from the longest pathname chain. In one embodiment, the unchanged node indicator is the last node indicator in the longest chain in a prefix tree.

In block 1550, the object name is inserted in the pathname. In one embodiment, a pathname slash (/) is inserted in the pathname and the object name is concatenated at the beginning of the pathname.

Figure 16:
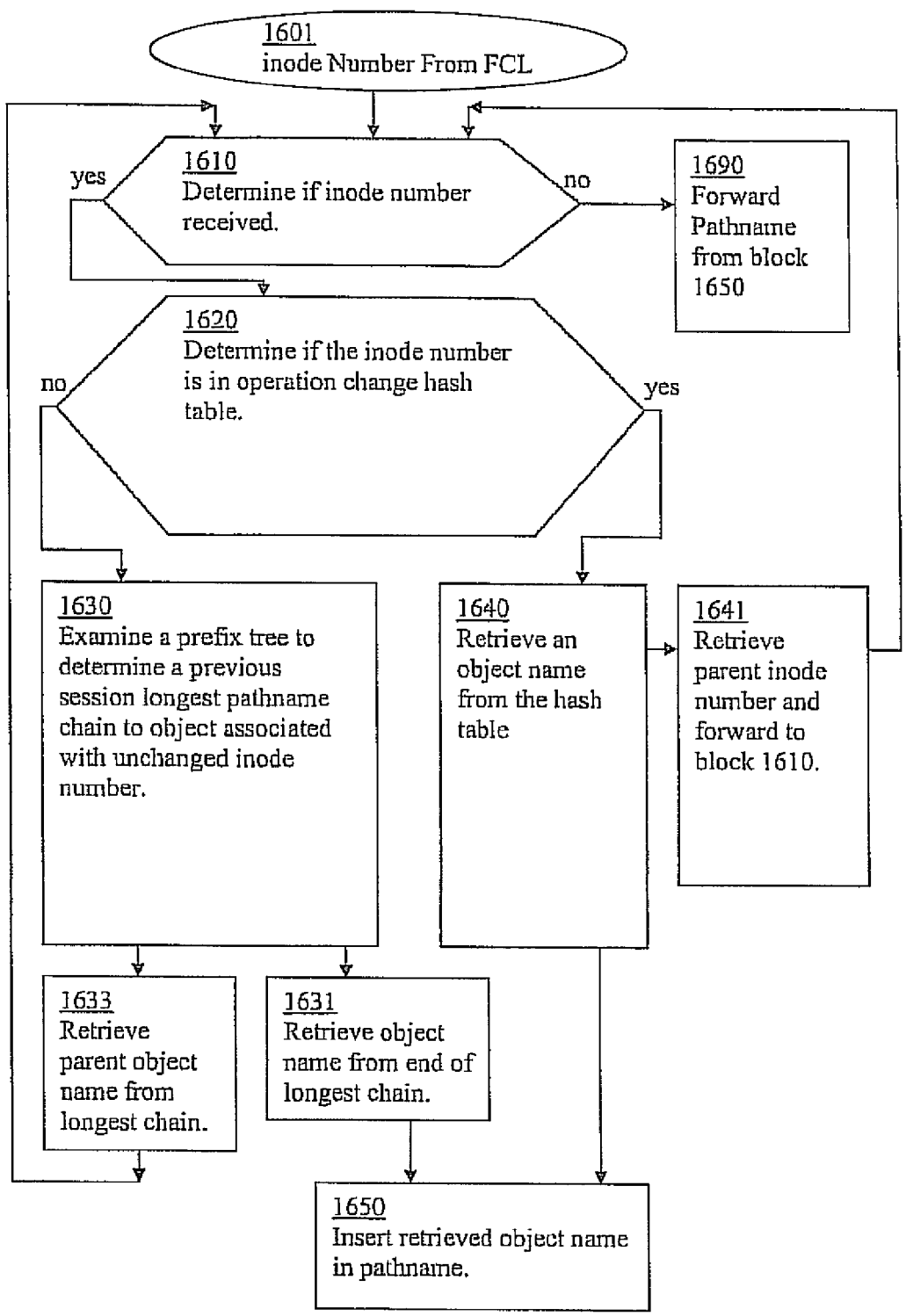
FIG. 16 is a flow chart of exemplary namespace conversion process in accordance with one embodiment.

FIG. 16 is a flow chart of exemplary namespace conversion process or method 1600 in accordance with one embodiment.

In block 1610, a determination is made if an inode number is received. In one embodiment, the inode number 1601 can come from a file change log or can be a parent inode number being returned from a subsequent block (e.g., block 1634, block 1641, etc.).

In block 1620, a determination is made if the inode number is in an operation change hash table. In one embodiment, the inode number is used as a key index into the operation change hash table.

In block 1630, a prefix chain is examined to determine the previous session longest pathname to an object associated with an unchanged inode number. In one embodiment, the prefix chain includes indications of unchanged objects.

In block 1631, an object name is retrieved from the end of the longest chain determined in block 1630. In one embodiment, the object name is associated with an unchanged object. The file system can directly map the unchanged inode number to a pathname object.

At block 1633, a parent inode number is retrieved from the longest chain. In one embodiment, the parent inode number is returned to block 1610.

At block 1640, an object name is retrieved from a hash table. In one embodiment, the object name is returned from a hash table lookup. The process proceeds to block 1650.

In block 1640, a parent inode number is retrieved and forwarded to block 1610.

In block 1650, the retrieved object name is inserted in a pathname.

The pathname is forwarded in block 1690. In one embodiment, the pathname is forwarded to a target storage system.

With reference again to FIG. 5, operational changes in the namespace and corresponding replication updates to the target storage system are shown. In one embodiment, an initial object pathname representation (e.g., object names of u and a though t except for i) of the source storage system image is shown in FIG. 4. However, the source storage file system utilizes unique inode numbers (e.g., 1 through 16) as shown in FIG. 7 to manage the name space internally and therefore a conversion namespace conversion process (e.g., 1300) is utilized to convert from inode numbers to object names. In one embodiment, nodes designated in a FCL can include 21, 5, 13, 8, etc. At time t5 block 1210 of replication method 1200 freezes the source storage system image 514 shown in FIG. 5. At block 1220, the node indicators 21, 5, 13, 8, etc associated with name space changes are retrieved from the FCL. Taking the first inode number 21 the namespace conversion process establishes changes to a pathname associated newly created object X associated with inode number 21. In an effort to avoid obfuscating the present explanation with excessive details, the present discussion jumps ahead to an example where the inode number 13 is retrieved from the FCL.

The inode number 13 from the FCL is received by block 1310 and a changed node to pathname object conversion process is performed in block 1320. In one embodiment, a hash table look up of inode number 13 in accordance with block 1420 indicates the node is associated with an operation change by virtue of being in the hash table (e.g., 1004) and the object name l' from cell 1024 is retrieved (e.g., by block 1430) and inserted in a path name (e.g., by block 1440). The partial path name is now l'. At block 1470, the parent inode number 21 is retrieved from cell 1014 and is forwarded to block 1410 and on to 1420 for recursive lookup in the hash table. The recursive lookup indicates inode number 21 is in cell 1002 and the object name x in cell 1022 is inserted in the path name to give a partial path name x/l'. The parent inode number 10 is fed back to 1420 and a hash table look up indicates inode number 10 is not associated with a namespace change. The inode number 10 is forwarded (e.g., by block 1450) to block 1340 which performs an unchanged node to pathname object conversion process.

The inode number 10 is received by block 1510 and a longest path name change to the unchanged object associated with inode number 10 is determined. In one exemplary implementation, a prefix tree 1100 is utilized to indicate the longest pathname to inode number 10 is inode1/inode7/inode8/inode10. Since inode number 10 is unchanged the file system can lookup the assignment of inode number 10 and determine inode number 10 is assigned to object j and the object indicator j is inserted in the pathname. The partial pathname is now j/x/l'. At block 1520, the parent node number 8 is retrieved from the longest chain. Block 1530 feeds the parent inode number 8 back into block 1310 for recursive lookup in the hash table.

The recursive lookup indicates inode number 8 is in cell 1003 and the object name h' in cell 1023 is inserted in the path name to give a partial path name h'/j/x/l'. The parent inode number 7 is fed back to 1420 and a hash table look up indicates inode number 7 is not association with a namespace change. The inode number 7 is forwarded (e.g., by block 1450) to block 1340 which performs an unchanged node to pathname object conversion process.

Utilizing the prefix tree 1100 a longest chain of inode number 1 and inode number 7 is identified. An object name of g is retrieved from the session beginning information for unchanged inode number 7 and the object name g is inserted in the path name to give a partial path name of g/h'/j/x/l'. The parent inode number 1 is forwarded back into block 1310 for recursive lookup in the hash table.

The recursive lookup into the hash table indicates inode number 1 is in cell 1001 and the object name a' in cell 1021 is inserted in the path name to give a partial path name a'/g/h'/j/x/l'. The parent inode number null is forwarded to block 1370 which recognizes the null indicator and the pathname a'/g/h'/j/x/l' is forwarded by block 130 to the target file system for utilization in updating the replicated target storage system image. Thus, inode number 13 utilized in management of files on the source file system including namespace changes can be efficiently translated and converted into the pathname a'/g/h'/j/x/l'. It is appreciated that similar recursive loops through the namespace conversion process 1220 can facilitate conversion of other inode number indicators into object pathnames.

Figure 17:
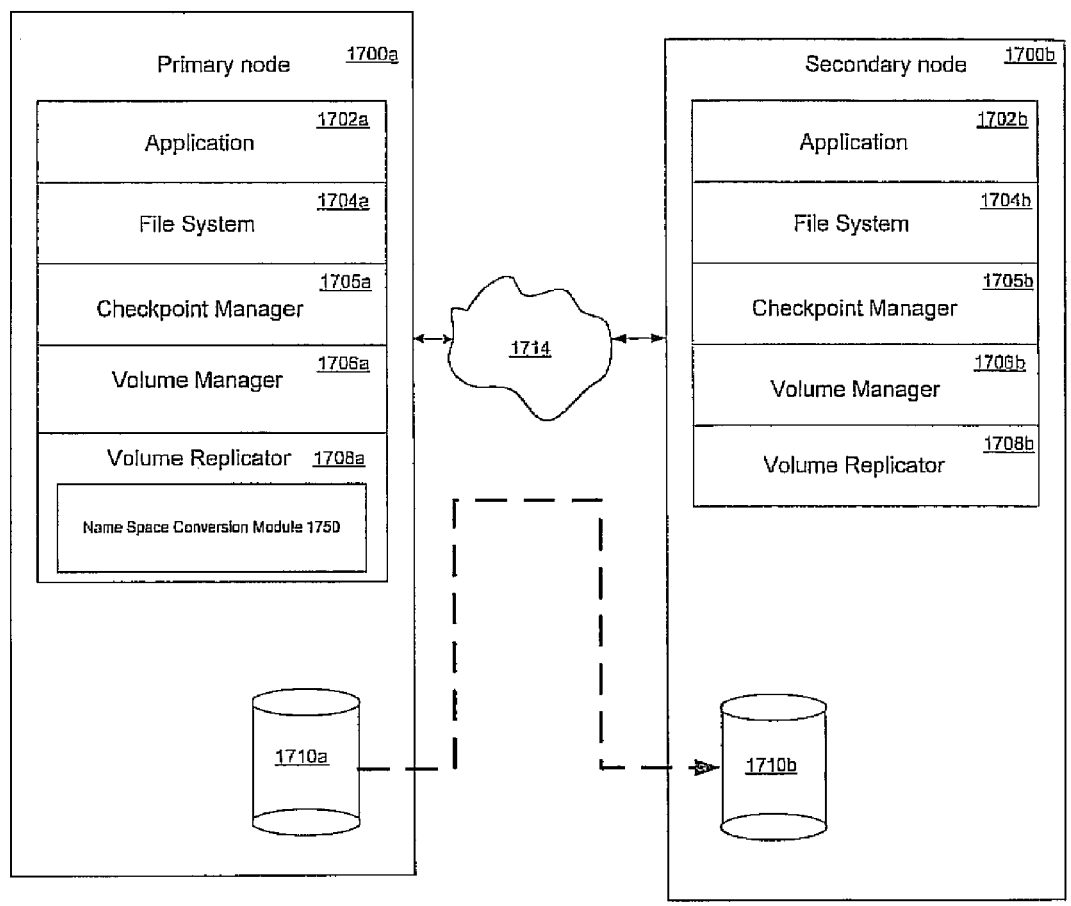
FIG. 17 illustrates a periodic replication operation within a replication system environment according to an embodiment.

FIG. 17 illustrates a periodic replication operation within a replication system environment 1700 according to an embodiment. In the illustrated embodiment, copies of incrementally modified or changed data of a primary data volume (Vol) within primary system 1700a are transferred to a replicated secondary data volume (R_Vol) within a secondary system 1700b periodically. To maintain the accessibility of the primary data volume, a point-in-time "snapshot" volume (S_Vol) is created and the periodic replication is performed using the snapshot volume. Similarly, to maintain the accessibility of the secondary data volume, a point-in-time "snapshot" volume (RS_Vol) is created and used at the secondary system 1700b to receive incremental changes from the primary system 1700a and to restore the replicated secondary data volume.

In the replication system of the illustrated embodiment, a primary node 1700a is coupled to a secondary system 1700b via a network 1714 (e.g., an IP network, LAN, WAN, or other communication link). Primary system 1700a and secondary system 1700b of the illustrated embodiment each respectively includes an application 1702, a file system 1704, a checkpoint manager 1705 and a volume manager 1706 including a volume replicator 1708 which can be implemented in respective processors and memory of primary system 1700a and secondary system 1700b. In one embodiment, the functionality for managing the creation of checkpoints is implemented by the checkpoint manager 1705. The FIG. 1 embodiment is initialized via the use of an initial synchronization. During the initial synchronization, the contents of a primary data volume (Vol) within primary system 1700a are transferred to a replicated secondary data volume (R_Vol) within the secondary system 1700b. In one embodiment, to maintain the accessibility of the primary data volume, a point-in-time "snapshot" volume (S_Vol) is created at a "checkpoint" in time and the initial synchronization (as well as subsequent periodic replication) is performed using the snapshot volume. As the initial synchronization is being performed, updates (e.g., write operations or other changes) to the primary data volume are tracked for later use in performing periodic replication according to an embodiment.

Primary system 1700a further includes a primary data volume 1710a that includes a source storage resource image. Secondary system 1700b includes a secondary data volume 1710b that includes a target storage resource image. In one embodiment, volume replicator 1708a includes namespace conversion module 1750 for performing namespace conversion. In one embodiment namespace conversion module 1750 corresponds to a replication module associated with volume replicator 1708a. It is appreciated a namespace conversion module can be implemented as part of a variety of environments. For example, namespace conversion module can be implemented as part of a distributed computing environment, a cloud computing environment, a client server environment, etc.

FIG. 18 is a block diagram of exemplary replication module 1800 in accordance with one embodiment. In one exemplary implementation, replication module 1800 includes instructions stored on a computer readable medium. The replication module 1800 and computer readable medium can be utilized in replication system environment 1700. Replication module 1880 can include instructions for performing a replication method.

Image freezing module 1810 freezes an image in a file system. File change log examination module 1820 determines node indicators associated with namespace changes. Namespace conversion module 1830 performs namespace conversion from node indicators to pathname indicators. Filter module 1840 filters unnecessary information. File data retrieval module 1850 retrieves file data. Operation delta forwarding module 1860 forwards the delta changes operation information between session checkpoints, including information associated with a pathname. It is appreciated that present modules and methods can include instructions stored on an article of manufacture including a computer readable medium, that if executed by a computing device cause the computing device to perform replication image storage operations including namespace conversion from node indicators to object indicators.

FIG. 19 is a block diagram of exemplary namespace conversion module 1900 in accordance with one embodiment. In one exemplary implementation, namespace conversion module 1900 includes instructions stored on a computer readable medium. In one exemplary implementation, namespace conversion module 1900 is similar to namespace conversion module 1830. Namespace conversion module 1900 can include instructions for performing a namespace conversion process or method.

Node information receiving module 1910 receives node information regarding file system operation changes. Changed node to pathname object conversion module 1920 performs a changed node to pathname object conversion process. Unchanged node to pathname object conversion module 1930 performs an unchanged node to pathname object conversion process. Object indicator insertion module 1940 performs object indicator insertion in the pathname. Null determination module 1950 determines if a parent node indication is null. Pathname forwarding module 1960 forwards the pathname. For example pathname forwarding module 1960 forwards the pathname to a target system storage resource.

FIG. 20 is a block diagram of exemplary changed mode to pathname object conversion module 2000 in accordance with one embodiment. In one exemplary implementation, changed mode to pathname object conversion module 2000 includes instructions stored on a computer readable medium. In one exemplary implementation, changed mode to pathname object conversion module 2000 is similar to changed mode to pathname object conversion module 1920. Changed mode to pathname object conversion module 2000 can include instructions for performing a changed mode to pathname object conversion process or method.

Node indicator receiving module 2010 receives a node indicator. Node association module 2020 determines if a node is associated with an operation change. Object indicator retrieval module 2030 retrieves an object name associated with the node. Parent node indicator module retrieval module 2050 retrieves a parent node indicator. Object insertion module 2050 inserts an object indictor in a pathname. Node indication forwarding module 2060 forwards a node indicator for further processing. In one embodiment, node indication forwarding module 2060 forwards a node indicator to an unchanged node to pathname object conversion module (e.g., block 1930).

FIG. 21 is a block diagram of exemplary unchanged node to pathname conversion module 2100 in accordance with one embodiment. In one exemplary implementation, unchanged node to pathname conversion module 2100 includes instructions stored on a computer readable medium. In one exemplary implementation, unchanged node to pathname conversion module 2100 is similar to unchanged node to pathname conversion module 1930. unchanged node to pathname conversion module 2100 can include instructions for performing unchanged node to pathname conversion process or method.

Longest chain module 2110 obtains a previous session longest pathname chain to an unchanged object. Parent node indicator retrieval module 2120 obtains a node indicator associated with a parent. Parent node indicator forwarding module 1530 forwards a parent node indicator. Unchanged object retrieval module 2140 retrieves unchanged object names from a longest pathname chain. Object insertion module 2150 inserts a retrieved object indicator in a pathname.

Figure 22:
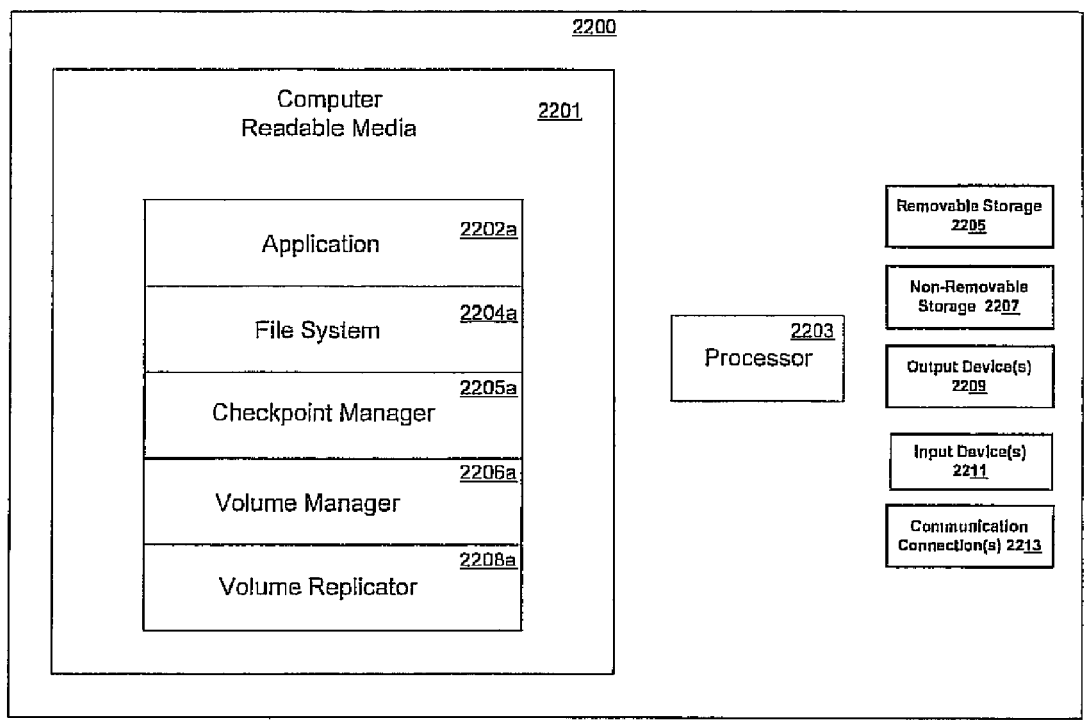
FIG. 22 shows an exemplary computer system according to one embodiment.

FIG. 22 shows an exemplary computer system 2200 according to one embodiment. Computer system 2200 depicts the components of a basic computer system providing the execution environment for certain hardware-based and software-based functionality for the above described embodiments. For example, computer system 2200 can be a system upon which the one or more software stacks (e.g., modules 1702-1708,1750, 1810-1860, 1910-1960, 2010-2060, 2110-2150, etc.) are instantiated. Computer system 2200 can be implemented as, for example, a server computer system, workstation computer system, desktop computer system, or laptop computer system. Similarly, computer system 2200 can be implemented as a handheld device. Computer system 2200 typically includes at least some form of computer readable media (e.g., computer readable media 2201). Computer readable media can also be a number of different types of media that can be accessed by computer system 2200 and can include, but is not limited to, removable and non removable computer storage media, flash memory, hard disk, optical disk drive, compact disk (CD) etc.).

In its most basic configuration, computer system 2200 typically includes processing unit 2203 and memory 2201. Depending on the exact configuration and type of computer system 2200 that is used, memory 2201 can be volatile (e.g., such as DRAM, etc.) 2201a, non-volatile 2201b (e.g., such as ROM, flash memory, etc.) or some combination of the two. Similarly, the memory 2201 can comprise other devices recites solid-state devices, such as, for example, magnetic disk-based media, optical media, or the like.

Additionally, computer system 2200 can include other mass storage systems (e.g., removable 2205 and/or non-removable 2207) such as magnetic or optical disks or tape. Similarly, computer system 2200 can include input devices 2209 and/or output devices 2211 (e.g., such as a display). Computer system 2200 can further include network connections 2213 to other devices, computers, networks, servers, etc. using either wired or wireless media. As all of these devices are well known in the art, they need not be discussed in detail.

It should further be noted, that the computer system 2200 can have some, most, or all of its functionality supplanted by a distributed computer system having a large number of dispersed computing nodes, as would be the case where the functionality of the computer system 2200 is partly or wholly executed using a cloud computing environment.

Present systems and methods can be implemented during runtime processing. In one exemplary implementation, the run time processing includes scanning a file change log and generating file/namespace changes on the fly. Present systems and methods can be implemented on top of a file log change service. Present systems and methods can be implemented with no or minimal data movement for pure namespace operations (e.g., rename, hardlink, etc.).

In one embodiment, each delta record return to a caller is accompanied with a FCL marker which uniquely identifies the entry in the FCL file. In one exemplary implementation, the caller can easily roll back the whole process by providing the marker with a roll back interface to an FCL module. The FCL module can roll back to the marker in the FCL file and "restart" at that point.

The present replication systems and methods facilitate efficient and effective replication of information. The information replication can be flexibly and incrementally performed for portions of a storage system image that change during operation sessions. The systems and methods can perform namespace conversion or transformation in which a node indicator is transformed into an object indicator while maintaining ordering requirements. The systems and methods can be implemented as run time processing. Pre-processing and post processing are not required and commitment of resources (e.g., memory resources, larger disk foot print, processing time, etc.) to such activities can be reduced or avoided.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the systems and methods included herein and their equivalents.

What is claimed is:

1. A method of efficient conversion of information associated with a node during file replication comprising:
   receiving node information regarding an operation change of a particular node in a file system;
   determining that the received node information is associated with the particular node of the file system identified in a file change log;
   in the event the received node information associated with the particular node identified in the file change log corresponds to namespace changes of the particular node between session checkpoints, performing a changed node to pathname object conversion process on the received node information using a name space conversion component, wherein said changed node to pathname object conversion process utilizes a name space alteration tracking data structure to determine a changed object indicator;
   in the event the received node information associated with the particular node identified in the file change log does not correspond to namespace changes of the particular node between session checkpoints, performing an unchanged node to pathname object conversion process on the received node information using the name space conversion component, wherein said unchanged node to pathname object conversion process utilizes a longest path tracking data structure to determine an unchanged object indicator;

inserting the changed or unchanged object indicator in a pathname of the particular node based upon results of at least one of said changed node to pathname object conversion process and said unchanged node to pathname object conversion process;

forwarding said pathname with said inserted object indicator to a target storage resource;

receiving a call to roll back one or more changes between session checkpoints for the particular node using a roll back interface and a marker uniquely identifying an entry in the file change log; and restarting conversion of the node information associated with the particular node during file replication from a point indicated by the marker.

2. The file replication method of claim 1 wherein said changed node to pathname object conversion process and said unchanged node to pathname object conversion process utilize data structures that return said changed and unchanged object indicators.

3. The file replication method of claim 1 wherein said changed node to pathname object conversion process and said unchanged node to pathname object conversion process utilize data structures that return parent node indicators.

4. The file replication method of claim 1 wherein the name space alteration tracking data structure maps a node indicator associated with a namespace change to a parent node indicator and an object name.

5. The file replication method of claim 4 wherein said name space alteration tracking data structure includes a hash table.

6. The file replication method of claim 1 wherein said longest path tracking data structure is a prefix tree.

7. The file replication method of claim 1 further comprising returning a parent object node indicator as an input to said changed node pathname object conversion process.

8. The file replication method of claim 1 further comprising returning a parent object node indicator as an input to said unchanged node to pathname object conversion process.

9. An article of manufacture including a non-transitory computer readable storage medium having instructions stored thereon that if executed by a computing device cause the computing device to perform a storage image replication, the instructions comprising:

an image freezing module that manages frozen snapshots of a source file system at session checkpoints;

a file change log examination module that retrieves entries in a file change log, wherein said entries correspond to namespace changes of node information of a particular node of the source file system between said session checkpoints;

a namespace conversion module that:
converts node indications corresponding to said entries from said file change log to pathname indications in the event said entries correspond to the namespace changes of the node information of the particular node between said session checkpoints, utilizes a name space alteration tracking data structure to determine a changed object indicator of the particular node in the event said entries correspond to the namespace changes of the particular node between said session checkpoints;

utilizes a longest path tracking data structure to determine an unchanged object indicator of the particular node in the event said entries do not correspond to the namespace changes of the particular node between said session checkpoints; and inserting the changed or unchanged object indicator in said pathname indications of the particular node based upon results of at least one of said changed node to pathname object conversion process and said unchanged node to pathname object conversion process;

a filter module that filters unnecessary operations;

a delta file data retrieval module that retrieves changes in file data of the particular node of the said source file system between said session checkpoints; and a delta operation module for:
forwarding said pathname indications with said inserted object indicator and said changes in said file data to a target storage resource;

receiving a call to roll back one or more of said changes of the particular node between session checkpoints using a roll back interface and a marker uniquely identifying an entry in the file change log; and restarting conversion of the node information associated with the particular node during file replication from a point indicated by the marker.

10. The computer readable medium of claim 9 wherein said namespace conversion module comprises:

a node indication receiving module that determines if a node indication is received;

a changed node to pathname object conversion module that performs a changed node to pathname object conversion process;

an unchanged node to pathname object conversion module that performs an unchanged node to pathname object conversion process; and an object indication insertion module for inserting an object name in a pathname.

11. The computer readable medium of claim 10 wherein said changed node to pathname object conversion module obtains an object name associated with a node involved corresponding namespace change.

12. The computer readable medium of claim 10 wherein said unchanged node to pathname object conversion module obtains an object name associated with a node not involved in a corresponding namespace change.

13. The computer readable medium of claim 10 wherein said node indication includes a unique inode number.

14. The computer readable medium of claim 10 wherein said changed node to pathname object conversion module and said unchanged node to pathname object conversion module utilize data structures that return said object name.

15. The computer readable medium of claim 10 wherein said changed node to pathname object conversion module recursively processes parent node indicators.

16. The computer readable medium of claim 10 wherein said unchanged node to pathname object conversion module recursively processes parent node indicators.

17. An information storage replication system comprising:
at least one computer processor; and
at least one memory, coupled to the at least one computer processor, having instructions stored therein which, when executed by the at least one computer processor, causes the at least one computer processor to perform operations comprising:
storing, in a source storage component, node information regarding an operation change in a file system;
managing, via a source storage manager, storage of information in said source storage component, including:

managing conversion of source internal node indicators of the file system to pathname indicators, wherein said source storage manager determines whether received node change information corresponds to namespace changes of a particular node of the file system between session checkpoints;

performing a changed node to pathname object conversion process on said node change information in the event the node change information corresponds to the namespace changes of the particular node between session checkpoints, wherein said changed node to pathname object conversion process utilizes a name space alteration tracking data structure to determine a changed object indicator; and performing an unchanged node to pathname object conversion process on said node change information in the event the node change information does not correspond to the namespace changes of the particular node between session checkpoints, wherein said unchanged node to pathname object conversion process utilizes a longest path tracking data structure to determine an unchanged object indicator; and inserting the changed or unchanged object indicator in said pathname indicators of the particular node based upon results of at least one of said changed node to pathname object conversion process and said unchanged node to pathname object conversion process;

receiving, via a delta operation module, a call to roll back one or more changes of the particular node between session checkpoints using a roll back interface and a marker uniquely identifying an entry in a file change log;

restarting, via a delta operation module, conversion of the node information associated with the particular node during file replication from a point indicated by the marker; and storing, via a target storage component, a replica of said pathname indicators with said inserted object indicator.

18. The information storage replication system of claim 17 wherein said data structures include:

a hash table that maps a node indication associated with a namespace change to a parent node indication and an object name; and said longest path tracking data structure includes a prefix tree that maps a longest path of an unchanged node from a previous session.

* * * * *